(12) United States Patent
Drobietz et al.

(10) Patent No.: US 8,523,515 B2
(45) Date of Patent: Sep. 3, 2013

(54) NOISE REDUCER FOR ROTOR BLADE IN WIND TURBINE

(75) Inventors: Roger Drobietz, Rheine (DE); Klaus Ulrich Koegler, Rheine (DE); Kevin Wayne Kinzie, Spartanburg, SC (US); Murray Fisher, Simpsonville, SC (US); Jamie Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/946,259

(22) Filed: Nov. 15, 2010

(65) Prior Publication Data

US 2011/0142666 A1    Jun. 16, 2011

(51) Int. Cl.
*F03D 1/06* (2006.01)
*F03D 11/00* (2006.01)

(52) U.S. Cl.
USPC .......................... 415/119; 416/228

(58) Field of Classification Search
USPC .............. 416/62, 146 R, 223 R, 228, 243; 415/119
See application file for complete search history.

(56) References Cited

U.S. PATENT DOCUMENTS

| 175,355 | A | * | 3/1876 | King ........................ 416/118 |
| 573,562 | A | | 12/1896 | Wittram |
| 1,861,065 | A | | 5/1932 | Poot |
| RE19,412 | E | | 1/1935 | Zaparka |
| 2,071,012 | A | | 2/1937 | Adams |
| 2,225,312 | A | | 12/1940 | Mason |
| 2,238,749 | A | | 4/1941 | Peltier |
| D131,271 | S | | 2/1942 | Colura |
| 2,312,219 | A | | 4/1943 | Sensenich |
| 2,469,167 | A | | 5/1949 | Little |
| 2,899,128 | A | | 8/1959 | Vaghi |
| 4,089,618 | A | * | 5/1978 | Patel .......................... 416/228 |
| 4,204,629 | A | | 5/1980 | Bridges |
| 4,618,313 | A | | 10/1986 | Mosiewicz |
| 4,720,244 | A | | 1/1988 | Kluppel et al. |
| 4,962,826 | A | | 10/1990 | House |
| 5,088,665 | A | * | 2/1992 | Vijgen et al. ................. 244/200 |
| 5,320,491 | A | | 6/1994 | Coleman et al. |

(Continued)

FOREIGN PATENT DOCUMENTS

DE   102006043462   3/2008
EP   0 652 367   5/1995

(Continued)

OTHER PUBLICATIONS

Co-pending U.S. Appl. No. 12/861,145, filed Aug. 23, 2010.

(Continued)

*Primary Examiner* — Nathaniel Wiehe
*Assistant Examiner* — Sean J Younger
(74) *Attorney, Agent, or Firm* — Dority & Manning, PA

(57) ABSTRACT

A rotor blade assembly for a wind turbine is disclosed. The rotor blade assembly includes a rotor blade having surfaces defining a pressure side, a suction side, a leading edge, and a trailing edge extending between a tip and a root. The rotor blade further includes a noise reducer configured on a surface of the rotor blade, the noise reducer comprising a plurality of serrations, each of the plurality of serrations defining a centerline. The centerline of each of the plurality of serrations defines a individual tailored angle dependent on at least one of span-wise location, local chord, width, length, bend angle, and thickness.

15 Claims, 7 Drawing Sheets

(56) References Cited

U.S. PATENT DOCUMENTS

| | | | |
|---|---|---|---|
| 5,328,329 | A | 7/1994 | Monroe |
| 5,522,266 | A | 6/1996 | Nicholson et al. |
| 5,533,865 | A | 7/1996 | Dassen et al. |
| 5,819,357 | A | 10/1998 | Gould |
| 6,352,601 | B1 | 3/2002 | Ray |
| 6,491,260 | B2 | 12/2002 | Borchers et al. |
| 6,729,846 | B1 | 5/2004 | Wobben |
| 6,733,240 | B2 | 5/2004 | Gliebe |
| 6,779,978 | B2 * | 8/2004 | Camargo Do Amarante .............. 416/228 |
| 6,789,769 | B2 | 9/2004 | Mau et al. |
| 6,830,436 | B2 | 12/2004 | Shibata et al. |
| 7,059,833 | B2 | 6/2006 | Stiesdal et al. |
| 7,328,770 | B2 | 2/2008 | Owens et al. |
| 7,351,041 | B2 | 4/2008 | Uselton et al. |
| 7,413,408 | B1 | 8/2008 | Tafoya |
| 7,458,777 | B2 | 12/2008 | Herr |
| 7,632,068 | B2 | 12/2009 | Bak et al. |
| 7,637,721 | B2 | 12/2009 | Driver et al. |
| 7,740,206 | B2 | 6/2010 | Eaton et al. |
| 7,976,283 | B2 | 7/2011 | Huck |
| 8,267,657 | B2 | 9/2012 | Huck et al. |
| 2001/0008032 | A1 | 7/2001 | Llewellyn-Jones et al. |
| 2003/0175121 | A1 | 9/2003 | Shibata et al. |
| 2004/0253114 | A1 | 12/2004 | Gunneskov et al. |
| 2007/0025858 | A1 | 2/2007 | Driver et al. |
| 2007/0041823 | A1 | 2/2007 | Miller |
| 2007/0065290 | A1 | 3/2007 | Herr |
| 2007/0077150 | A1 | 4/2007 | Llorente Gonzalez |
| 2007/0294848 | A1 | 12/2007 | Dumler |
| 2008/0001363 | A1 | 1/2008 | Bhate |
| 2008/0061192 | A1 | 3/2008 | Sullivan |
| 2008/0080977 | A1 | 4/2008 | Bonnet |
| 2008/0107540 | A1 | 5/2008 | Bonnet |
| 2008/0166241 | A1 | 7/2008 | Herr et al. |
| 2008/0187442 | A1 | 8/2008 | Standish et al. |
| 2008/0298967 | A1 | 12/2008 | Matesanz et al. |
| 2009/0016891 | A1 | 1/2009 | Parsania et al. |
| 2009/0074585 | A1 | 3/2009 | Koegler et al. |
| 2009/0097976 | A1 | 4/2009 | Driver et al. |
| 2009/0104038 | A1 | 4/2009 | Grabau |
| 2009/0126131 | A1 | 5/2009 | Delaere et al. |
| 2009/0274559 | A1 | 11/2009 | Petsche et al. |
| 2010/0028161 | A1 | 2/2010 | Vronsky et al. |
| 2010/0068042 | A1 | 3/2010 | Brück et al. |
| 2010/0101037 | A1 | 4/2010 | Gross et al. |
| 2010/0104436 | A1 | 4/2010 | Herr et al. |
| 2010/0329879 | A1 | 12/2010 | Presz, Jr. et al. |
| 2011/0018282 | A1 | 1/2011 | Hayashi et al. |
| 2011/0042524 | A1 | 2/2011 | Hemmelgarn et al. |
| 2011/0142637 | A1 | 6/2011 | Riddell et al. |
| 2011/0142666 | A1 | 6/2011 | Drobietz et al. |
| 2011/0223030 | A1 | 9/2011 | Huck et al. |
| 2012/0027590 | A1 | 2/2012 | Bonnet |
| 2012/0134817 | A1 | 5/2012 | Bagepalli et al. |

FOREIGN PATENT DOCUMENTS

| | | |
|---|---|---|
| EP | 0 652 367 A1 | 5/1995 |
| EP | 2028366 | 2/2009 |
| EP | 2053240 | 4/2009 |
| EP | 2 138 714 | 12/2009 |
| EP | 2216545 | 8/2010 |
| EP | 2 253 838 | 11/2010 |
| EP | 2 270 312 | 1/2011 |
| JP | 2000120524 | 4/2000 |
| JP | 2003254225 | 9/2003 |
| WO | WO 98/21091 | 5/1998 |
| WO | WO 2004/088130 | 10/2004 |
| WO | WO 2008/035149 | 3/2008 |
| WO | WO 2008/113349 | 9/2008 |
| WO | WO 2008/131800 | 11/2008 |
| WO | WO 2009/025549 | 2/2009 |

OTHER PUBLICATIONS

Co-pending U.S. Appl. No. 12/939,531, filed Nov. 4, 2010.
Co-pending U.S. Appl. No. 12/943,135, filed Nov. 10, 2010.
Abstract of WO1998/021091, May 22, 1998.
Search report issued in connection with DK Patent Application No. PA 2011 70620, Jul. 31, 2012.
Risoe National Laboratory for Sustainable Energy, "Controllable Rubber Trailing Edge Flap May Ease Stress on Wind Turbine Blades". Renewable Energy World.com, pp. 1-3, Feb. 17, 2010.
Risoe National Laboratory for Sustainable Energy, "Successful Wind Tunnel Test of Controllable Rubber Trailing Edge Flap for Wind Turbine Blades". Science Daily, pp. 1-2, Feb. 19, 2010.
Risoe National Laboratory for Sustainable Energy, The Technical University of Denmark, "Flexible Trailing Edge Flap for Blades to Make Wind PPower Cheaper". Science Daily, pp. 1-2, Apr. 7, 2011.
Office Action issued in connection with DK Application No. PA 2011 70620, Aug. 7, 2012.

* cited by examiner

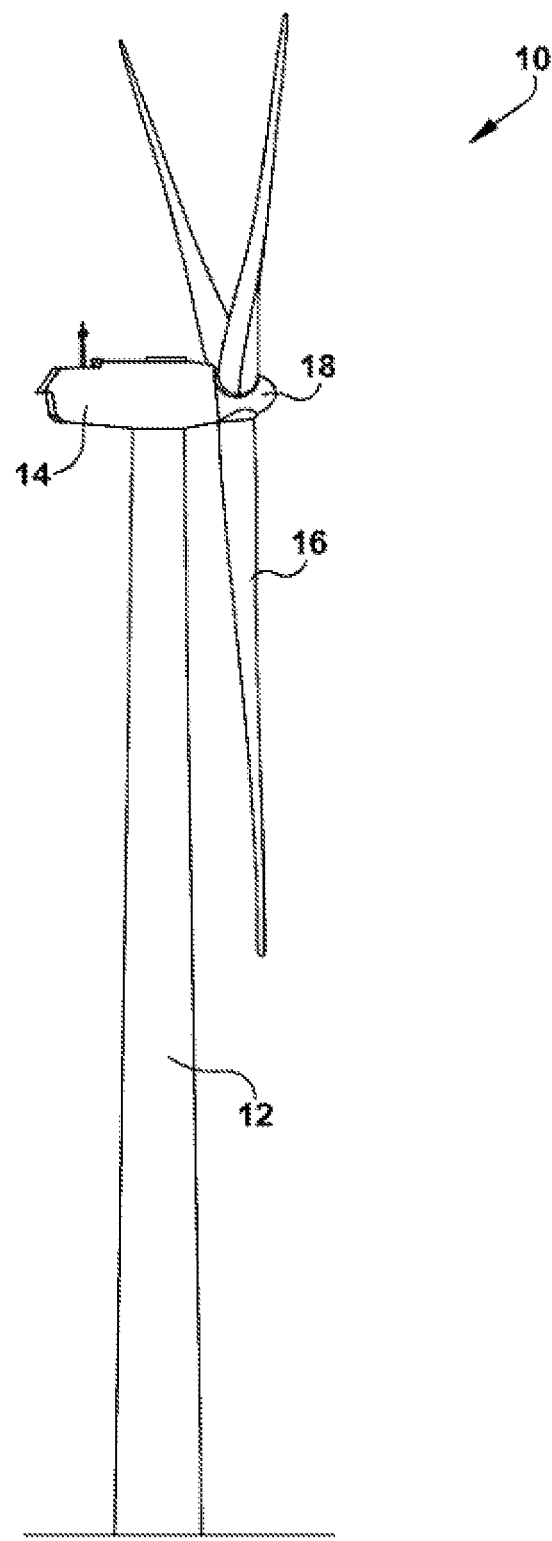
FIG. -1-

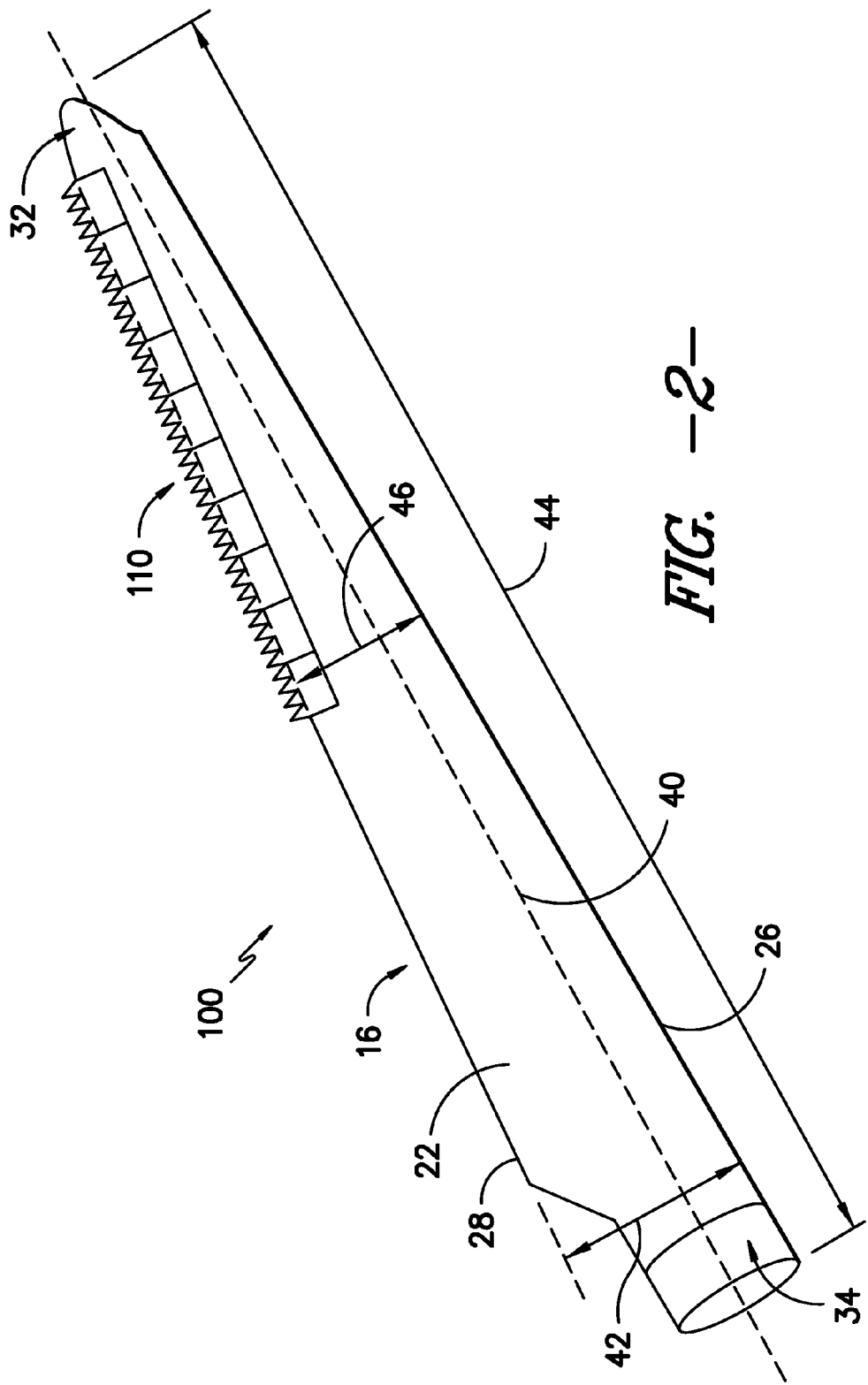

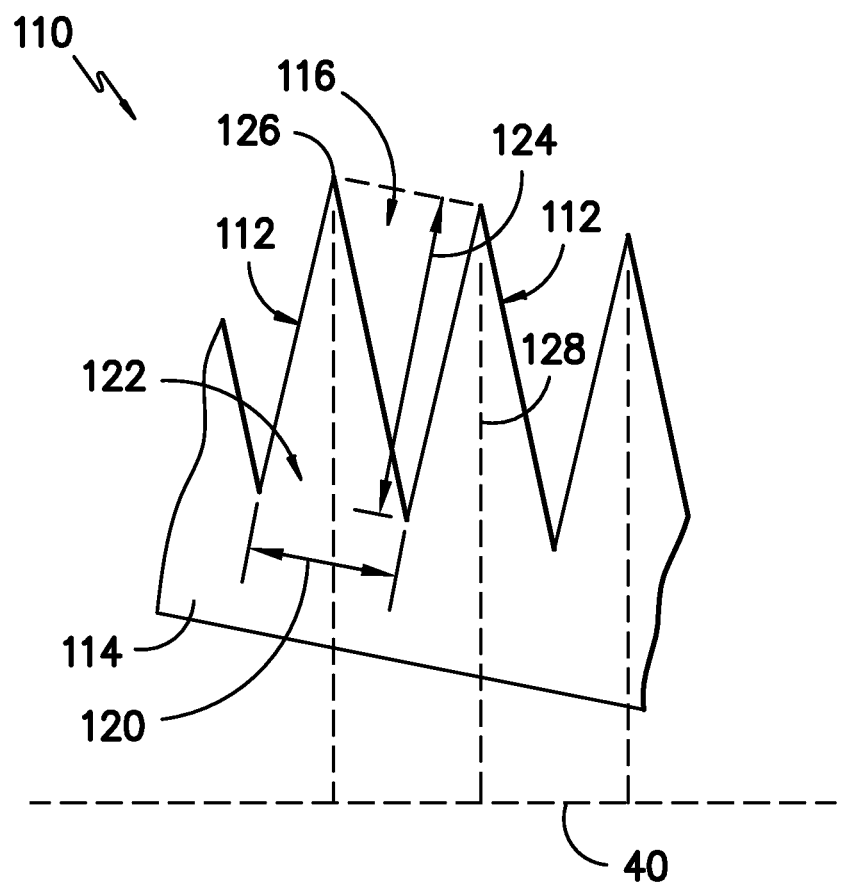
FIG. -3-

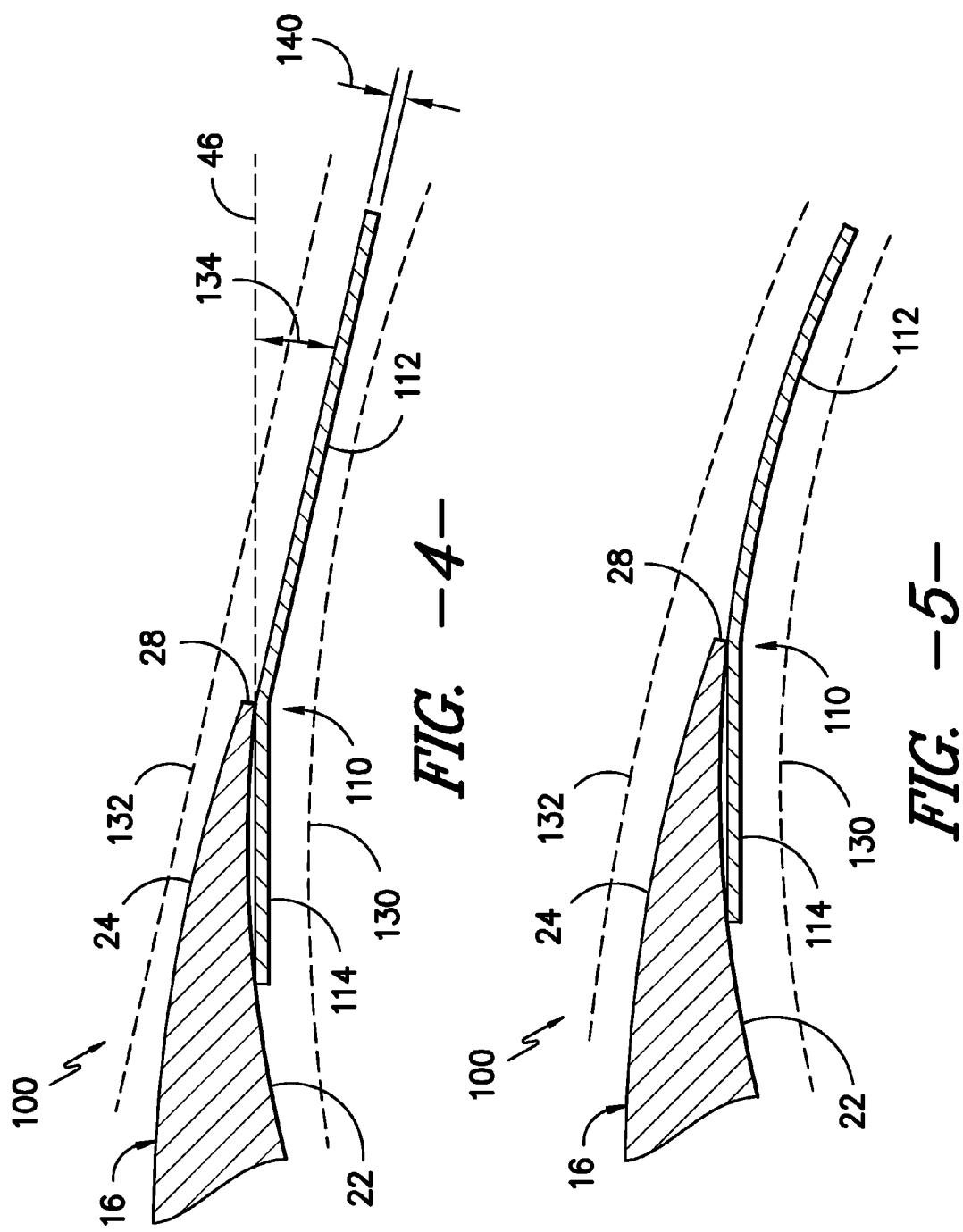

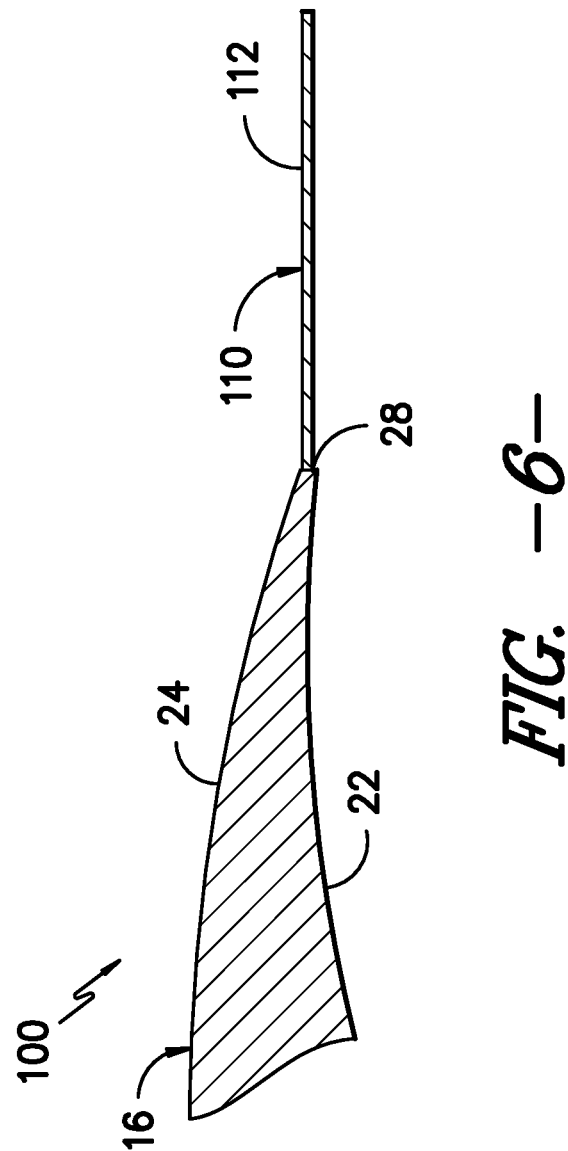
FIG. -6-

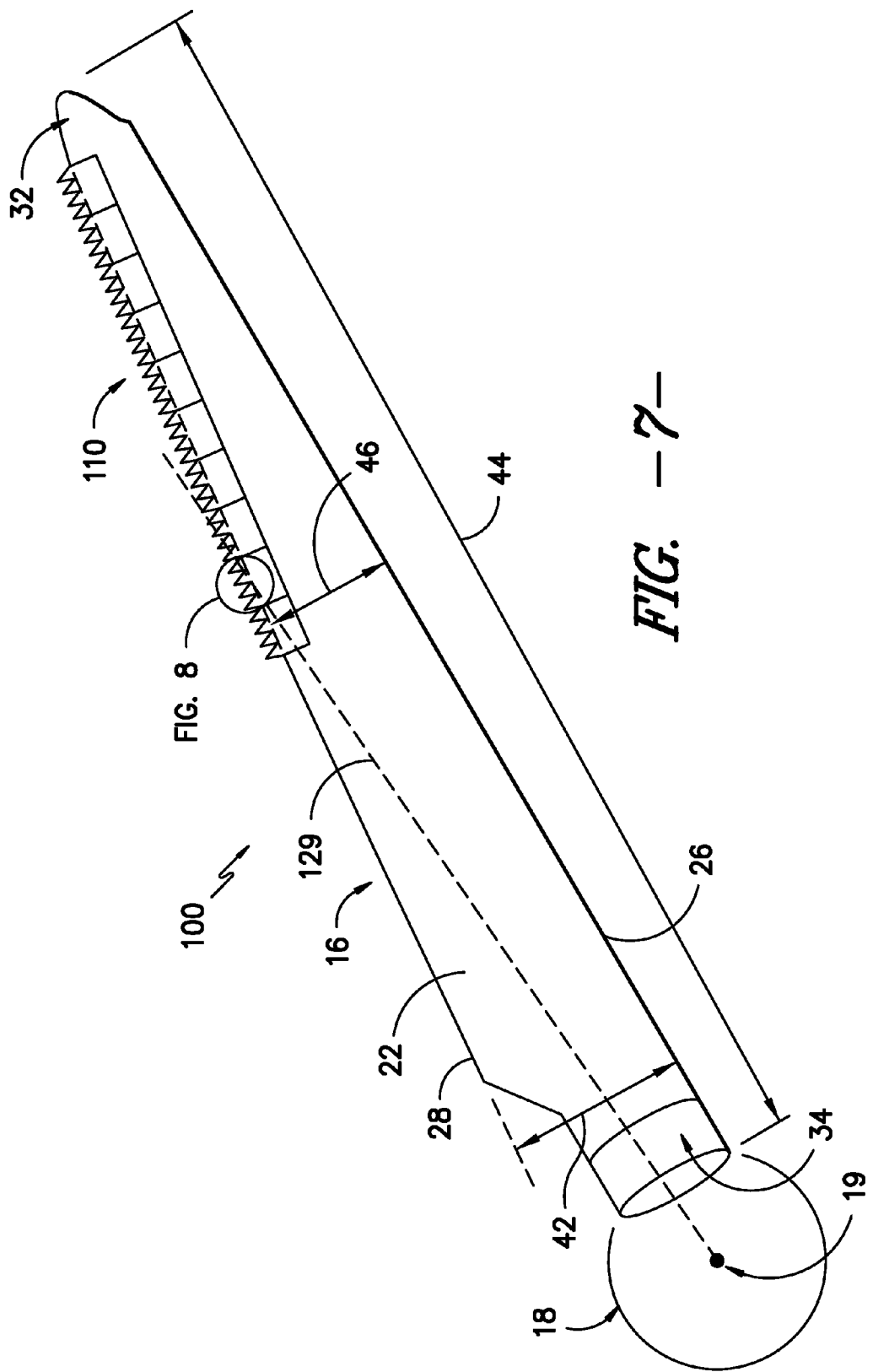
FIG. -7-

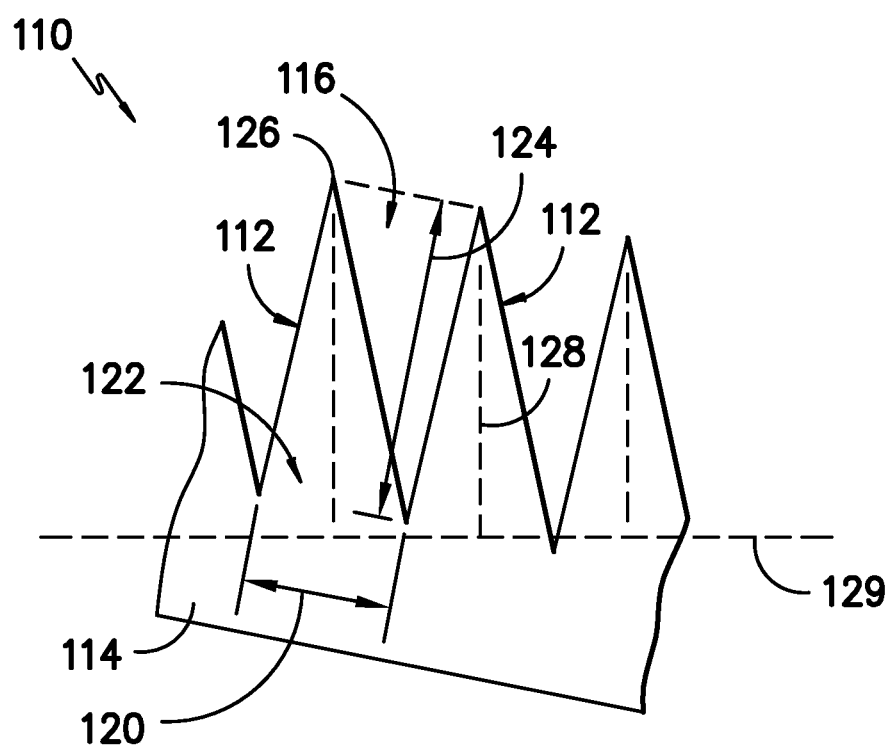
FIG. -8-

NOISE REDUCER FOR ROTOR BLADE IN WIND TURBINE

FIELD OF THE INVENTION

The present disclosure relates in general to wind turbine rotor blades, and more particularly to noise reducers configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent to the trailing edges of the rotor blades. For example, noise reducers may be attached to the trailing edges of the rotor blades to reduce the noise and increase the efficiency associated with the rotor blade. However, typical prior art noise reducers have a variety of disadvantages, and may not adequately reduce the noise associated with typical rotor blades. For example, currently known noise reducers may not account for various characteristics of the wind flow past the rotor blades. This failure may impede the noise reduction characteristics of the noise reducers. Further, many currently known noise reducers include a plurality of serrations. However, the serrations of many currently known noise reducers may have similar sizes and shapes throughout the length of the noise reducer. Thus, the noise reducer may fail to individually account for changes in the wind flow characteristics throughout the length of the rotor blade. This failure may further impede the noise reduction characteristics.

Thus, an improved noise reducer for a rotor blade would be desired. For example, a noise reducer with improved noise reduction features would be advantageous. Specifically, a noise reducer that accounts for various characteristics of the wind flow past the rotor blade would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having surfaces defining a pressure side, a suction side, a leading edge, and a trailing edge extending between a tip and a root. The rotor blade further includes a noise reducer configured on a surface of the rotor blade, the noise reducer comprising a plurality of serrations, each of the plurality of serrations defining a centerline. The centerline of each of the plurality of serrations defines a individual tailored angle dependent on at least one of span-wise location, local chord, width, length, bend angle, and thickness In another embodiment, a rotor blade assembly for a wind turbine is disclosed. The rotor blade assembly includes a rotor blade having surfaces defining a pressure side, a suction side, a leading edge, and a trailing edge extending between a tip and a root. The rotor blade further defines a pitch axis. The rotor blade assembly further includes a noise reducer configured on a surface of the rotor blade, the noise reducer comprising a plurality of serrations, each of the plurality of serrations defining a centerline. The centerline of each of the plurality of serrations is in the range between approximately 10 degrees from perpendicular to the pitch axis and approximately perpendicular to the pitch axis.

In another embodiment, a rotor blade assembly for a wind turbine for a wind turbine is disclosed. The rotor blade assembly includes a rotor hub defining a center point, and a rotor blade extending from the rotor hub, the rotor blade having surfaces defining a pressure side, a suction side, a leading edge, and a trailing edge extending between a tip and a root. The rotor blade assembly further includes a noise reducer configured on a surface of the rotor blade, the noise reducer comprising a plurality of serrations, each of the plurality of serrations defining a centerline. A line is defined for each of the plurality of serrations between the centerline of each of the plurality of serrations and the center point of the rotor hub. The centerline of each of the plurality of serrations is in the range between approximately 10 degrees from perpendicular to the line and approximately perpendicular to the line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade assembly of the present disclosure;

FIG. 3 is a top view of one embodiment of a noise reducer of the present disclosure;

FIG. 4 is a cross-sectional view of one embodiment of a noise reducer of the present disclosure;

FIG. 5 is a cross-sectional view of another embodiment of a noise reducer of the present disclosure;

FIG. 6 is a cross-sectional view of yet another embodiment of a noise reducer of the present disclosure;

FIG. 7 is a perspective view of another embodiment of a rotor blade assembly of the present disclosure; and, FIG. 8 is a top view of another embodiment of a noise reducer of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The rotor hub 18 defines a center point 19 (see FIG. 7). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 and 7, a rotor blade 16 according to the present disclosure may include surfaces defining a pressure side 22 and a suction side 24 (see FIGS. 4 through 6) extending between a leading edge 26 and a trailing edge 28, and may extend from a blade tip 32 to a blade root 34.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a pitch axis 40, as shown in FIGS. 2 and 3. The pitch axis 40 may generally be defined with respect to the rotor hub 18 of the wind turbine 10. For example, the pitch axis 40 may extend generally perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

The rotor blade 16 may further define chord 42 and a span 44. As shown in FIGS. 2 and 7, the chord 42 may vary throughout the span 44 of the rotor blade 16. Thus, as discussed below, a local chord 46 may be defined for the rotor blade 16 at any point on the rotor blade 16 along the span 44.

As illustrated in FIGS. 2 through 8, the present disclosure may further be directed to a rotor blade assembly 100. The rotor blade assembly 100 may include a noise reducer 110 and a rotor blade 16. In general, the noise reducer 110 may be configured on a surface of the rotor blade 16, and may reduce the aerodynamic noise being emitted from the rotor blade 16 during operation of the wind turbine 10 and/or may increase the efficiency of the rotor blade 16. In an exemplary embodiment of the present disclosure, the noise reducer 110 may be configured on a surface of the rotor blade 16 adjacent the trailing edge 28 of the rotor blade 16. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIGS. 2 through 5 and 7 through 8, the noise reducer 110 may be configured on, such as mounted to, the pressure side 22 of the rotor blade 16. In alternative embodiments, the noise reducer 110 may be configured on, such as mounted to, the suction side 24. In yet other alternative embodiments, the noise reducer 110 may be configured on the rotor blade 16 between the pressure side 22 and the suction side 24.

As shown in FIG. 6, for example, the noise reducer 110 may be configured on the trailing edge 28 between the pressure side 22 and the suction side 24. In this embodiment, the rotor blade 16 may be formed from one or more shell portions. For example, one shell portion may include the pressure side 22 and extend between the leading edge 26 and the trailing edge 28, while another shell portion may include the suction side 24 and extend between the leading edge 26 and the trailing edge 28. The noise reducer 110 may be mounted between these shell portions such that a portion of the noise reducer 110 is disposed in the interior of the rotor blade 16, while another portion extends from the rotor blade 16. Alternatively, the noise reducer 110 may extend through a shell portion of the rotor blade 16 at a desired location, such as at the trailing edge 28. In further alternative embodiments, the noise reducer 110 may be mounted directly to the exterior of the rotor blade 16 between the pressure side 22 and the suction side 24 through the use of, for example, a suitable adhesive or suitable mechanical fasteners. For example, in exemplary embodiments, the noise reducer 110 may be mounted directly to the trailing edge 28.

The noise reducer 110 may include a plurality of serrations 112. In some embodiments, the serrations 112 may extend from a base plate 114. In these embodiments, the base plate 114 may generally be that portion of the noise reducer 110 that is mounted to the rotor blade 16 to configure the noise reducer 110 on a surface of the rotor blade 16. Alternatively, the serrations 112 may be mounted directly to the rotor blade 16, or may be an integral part of the rotor blade 16. For example, in embodiments wherein the noise reducer 110 is configured on the trailing edge 28, the trailing edge 28 may simply include the plurality of serrations 112 extending therefrom, and the serrations 112 may be integral with the trailing edge 28.

The noise reducer 110 may, in some embodiments, be formed from a plurality of noise reducer sections. Each section may include one or more serrations 112, and each section may further include a base plate portion. Alternatively, the noise reducer 110 may be a singular, unitary component.

As shown, adjacent serrations 112 may generally define indentations 116 therebetween. While in exemplary embodiments the serrations 112 are generally V-shaped, defining generally V-shaped indentations 116, in alternative embodiments the serrations 112 and indentations 116 may be U-shaped, or may have any other shape or configuration suitable for reducing the noise being emitted from and/or increasing the efficiency of the rotor blade 16 during operation of the wind turbine 10. For example, in some embodiments, the serrations 112 and indentations 116 may be generally sinusoidal or squared-sinusoidal.

As shown in FIGS. 3 and 8, each of the serrations 112 may have a serration width 120. The serration width 120 may be defined for each serration 112 at a base 122 of each serration. Additionally, a serration length 124 may be defined for each serration 112. The length 124 may be measured between the base 122 and a tip 126 of the serration 112, and may be defined generally perpendicularly to the base 122. Further, each of the serrations 112 may have a centerline 128. The centerline 128 may extend through the tip 126 of the serration 112, such as through the center of the tip 126, and through the base 122 of the serration, such as through the center of the base 122, and may generally bisect the serration 112.

It should be understood that, while exemplary embodiments of the serrations 112 are discussed below, a serration 112 according to the present disclosure may have any suitable characteristics, such as width 120, length 124, shape, or orientation, depending on the desired noise reduction characteristics for the noise reducer 110. Further, in exemplary embodiments, each individual serration 112 may have individual characteristics as required to achieve optimum noise reduction characteristics. In alternative embodiments, however, various groups of serrations 112 may have similar characteristics, or all serrations 112 may have similar characteristics, depending on the desired noise reduction characteristics for the noise reducer 110.

In some embodiments as shown in FIGS. 2 and 3, the centerline 128 of a serration 112 according to the present disclosure may be oriented with respect to the pitch axis 40 of the rotor blade 16. For example, in some embodiments, the centerline 128 may be in the range between approximately 10 degrees from perpendicular to the pitch axis 40 and approximately perpendicular to the pitch axis 40. Alternatively, the centerline 128 may be in the range between approximately 5 degrees from perpendicular to the pitch axis 40 and approximately perpendicular to the pitch axis 40. In further alternative exemplary embodiments, the centerline 128 may be approximately perpendicular to the pitch axis 40. It should be understood, however, that the present disclosure is not limited to serrations 112 having certain angles as discussed above, and rather that any suitable serration 112 having any suitable angle is within the scope and spirit of the present disclosure. Advantageously, orienting the centerline 128 with respect to the pitch axis 40 as discussed above may improve the noise reduction characteristics of the noise reducer 110 of the present disclosure. For example, the wind flow over the rotor blade assembly 100 may, in many embodiments, be generally perpendicular to the pitch axis 40. Orientation of the serrations 112 with respect to the pitch axis 40 may allow the serrations 112 to better interact with the wind flow, thus improving the noise reduction characteristics of the present noise reducer 110.

In alternative embodiments, the centerline 128 of a serration 112 according to the present disclosure may be otherwise oriented to improve the noise reduction characteristics of the noise reducer 110 of the present disclosure. For example, as shown in FIGS. 7 and 8, the centerline 128 of a serration 112 may be oriented with respect to a line 129 from the base 122, such as the center of the base 122, to the center point 19 of the rotor hub 18 of the wind turbine 10. As shown, the line 129 may be defined individually for each serration 112, such that each serration 112 has an individual orientation with respect to other serrations 112. In some embodiments, the centerline 128 may be in the range between approximately 10 degrees from perpendicular to the line 129 and approximately perpendicular to the line 129. Alternatively, the centerline 128 may be in the range between approximately 5 degrees from perpendicular to the line 129 and approximately perpendicular to the line 129. In further alternative exemplary embodiments, the centerline 128 may be approximately perpendicular to the line 129. It should be understood, however, that the present disclosure is not limited to serrations 112 having certain angles as discussed above, and rather that any suitable serration 112 having any suitable angle is within the scope and spirit of the present disclosure. Advantageously, orienting the centerline 128 with respect to the line 129 as discussed above may improve the noise reduction characteristics of the noise reducer 110 of the present disclosure. For example, the wind flow over the rotor blade assembly 100 may, in many embodiments, be oriented with respect to the line 129 for each individual serration 112. Orientation of the serrations 112 with respect to the line 129 may allow the serrations 112 to better interact with the wind flow, thus improving the noise reduction characteristics of the present noise reducer 110.

As discussed above, in exemplary embodiments, each individual serration 112 may have individual characteristics, such as width 120, length 124, shape, or orientation, as required to achieve optimum noise reduction characteristics. Further, in some embodiments, each individual serration 112 may have a centerline 128 defining a tailored angle dependent upon a variety of factors. The angle in some embodiments may be tailored with respect to the pitch axis 40, line 129, or the trailing edge 28. Tailoring of the angle for each individual serration may be dependent upon factors including but not limited to location along the span 44, local chord 46, width 120, length 124, bend angle (discussed below), and/or thickness (discussed below). It should be understood that the factors for tailoring the angle of individual serrations are not limited to those disclosed above. Rather, any suitable factor discussed herein or otherwise is within the scope and spirit of the present disclosure.

As discussed above, each serration 112 may extend between a base 122 and a tip 126. In some embodiments, such as in embodiments wherein the serrations 112 are generally V-shaped, the tips 126 may generally be the pointed ends of the serrations 112. In these embodiments, the tips 126 have a minimal or no radius. In other embodiments, however, the tips 126 may be rounded. In these embodiments, the rounded tips 126 may each have a radius. In some embodiments, the radius of a tip 126 may be less than or equal to approximately 2 millimeters. In other embodiments, the radius of a tip 126 may be less than or equal to approximately 1 millimeter. It should be understood, however, that the present disclosure is not limited to tips 126 having certain radii as discussed above, but rather that any suitable tip 126 with any suitable radius is within the scope and spirit of the present disclosure.

As discussed above, each of the serrations 112 may define a width 120 and a length 124. In some exemplary embodiments, the width 120 and length 124 of each serration 112 may be sized to optimize the noise reduction characteristics of the noise reducer 110. For example, in some embodiments, a serration 112 may have a length 124 to width 120 ratio in the range between approximately 0.5:1 and approximately 4:1. In other embodiments, a serration 112 may have a length 124 to width 120 ratio in the range between approximately 1:1 and approximately 2:1. In yet other embodiments, a serration 112 may have a length 124 to width 120 ratio of approximately 2:1. It should be understood, however, that the present disclosure is not limited to serrations 112 having certain ratios as discussed above, but rather that any suitable serration 112 with any suitable ratio is within the scope and spirit of the present disclosure.

As mentioned above, a local chord 46 may be defined for the rotor blade 16 at any point on the rotor blade 16 with respect to the span 44. Thus, for example, a local chord 46 may be defined for each of the serrations 112. For example, the local chord 46 may be measured along the span 44 at any point along the width 120 of the serration 112, or may be calculated as an average of the chord lengths throughout the width 120 of the serration 112.

The serrations 112 may, in exemplary embodiments, be optimized with respect to the local chords 46 for each serration 112 to optimize the noise reduction characteristics of the noise reducer 110. For example, in some embodiments, the length 124 of a serration 112 may be in the range between approximately 5% of the local chord 46 for the serration 112 and approximately 15% of the local chord 46 for the serration 112. In other embodiments, the length 124 of a serration 112 may be approximately 10% of the local chord 46 for the serration 112. It should be understood, however, that the present disclosure is not limited to serrations 112 having certain lengths 124 as discussed above, but rather that any suitable serration 112 with any suitable length 124 is within the scope and spirit of the present disclosure.

As illustrated in FIGS. 4 and 5, the rotor blade assembly 100 of the present disclosure may, in operation, be subjected to a wind flow. The wind flow past the rotor blade assembly 100 may create flow streamlines. For example, the wind flow over the pressure side 22 may create a flow streamline, and the wind flow over the suction side 24 may also create a flow streamline. Further, local flow streamlines may be defined for the rotor blade 16 at any point on the rotor blade 16 along the span 44. Thus, for example, a local flow streamline may be defined for each of the serrations 112. For example, the local flow streamline may be measured along the span 44 at any point along the width 120 of the serration 112, or may be calculated as an average of the local flow streamlines throughout the width 120 of the serration 112. Further, in some embodiments, the local flow streamline for a serration 112 may be a local pressure side flow streamline 130 or a local suction side flow streamline 132. Alternatively, the local flow streamline may be calculated based on the local pressure side flow streamline 130 and the local suction side flow streamline 132, and may be, for example, a local average flow streamline.

The serrations 112 may, in exemplary embodiments, be optimized with respect to a local flow streamline for each serration 112 to optimize the noise reduction characteristics of the noise reducer 110. For example, as shown in FIGS. 4 and 5, a cross-section of a serration 112 may be approximately parallel to a local flow streamline. For example, FIGS. 4 and 5 illustrate the cross-section of a serration 112 being approximately parallel to the local suction side flow streamline 132. However, the cross-section of a serration 112 may alternatively or additionally be approximately parallel to, for example, the local pressure side flow streamline 130 or the local average flow streamline.

Additionally or alternatively, as shown in FIG. 4, a serration 112 may define a bend angle 134. The bend angle 134 may be defined with respect to the local chord 46 for the serration 112. In exemplary embodiments, the bend angle 134 may be calculated based on a local flow streamline, in order to optimize noise reduction with respect to the local flow streamline and the individual serration 112. For example, the bend angle 134 may be calculated such that the serration 112 extending at the bend angle 134 may approximate the local flow streamline. In some embodiments, the bend angle 134 may be calculated based on a local flow streamline such that a cross-section of the serration 112 extending at the bend angle 134 is approximately parallel to the local flow streamline.

In some embodiments, as shown in FIG. 4, the cross-section of the serration 112 may be generally linear. The linear cross-section may, in exemplary embodiments, approximate a local flow streamline and/or be approximately parallel to the local flow streamline. In alternative embodiments, as shown in FIG. 5, the cross-section of the serration 112 may be generally curvilinear. The curvilinear cross-section may, in exemplary embodiments, approximate a local flow streamline and/or be approximately parallel to the local flow streamline.

Each serration 112 may further define a thickness 140, as shown in FIG. 4. The thickness of a serration 112 may, in some embodiments, be in the range between approximately 0.1 millimeters and approximately 2.5 millimeters. In other embodiments, the thickness of a serration 112 may be in the range between approximately 1 millimeter and approximately 2 millimeters. It should be understood, however, that the present disclosure is not limited to serrations 112 having certain thicknesses 140, as discussed above, but rather that any suitable serration 112 with any suitable thickness 140 is within the scope and spirit of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having surfaces defining a pressure side, a suction side, a leading edge, and a trailing edge extending between a tip and a root, the rotor blade further defining a pitch axis; and,
a noise reducer configured on a surface of the rotor blade, the noise reducer comprising a plurality of serrations, each of the plurality of serrations defining a centerline,
wherein the centerline of each of the plurality of serrations is in the range between approximately 10 degrees from perpendicular to the pitch axis and approximately perpendicular to the pitch axis,
wherein a cross-section of each of the plurality of serrations is approximately parallel to a local flow streamline defined for that serration, and
wherein each of the plurality of serrations is individually oriented based on the centerline, and wherein a bend angle of each of the plurality of serrations is individually set to a pre-calculated orientation based on the local flow streamline, the cross-section and the spanwise location of that serration.

2. The rotor blade assembly of claim 1, wherein the centerline of each of the plurality of serrations is approximately perpendicular to the pitch axis.

3. The rotor blade assembly of claim 1, each of the plurality of serrations defining a width and a length, and wherein each of the plurality of serrations has a length to width ratio in the range between approximately 0.5:1 and approximately 4:1.

4. The rotor blade assembly of claim 3, wherein each of the plurality of serrations has a length to width ratio in the range between approximately 1:1 and approximately 2:1.

5. The rotor blade assembly of claim 1, the rotor blade defining a local chord for each of the plurality of serrations, each of the plurality of serrations defining a length, and wherein the length of each of the plurality of serrations is in the range between approximately 5% of the local chord and approximately 15% of the local chord.

6. The rotor blade assembly of claim 5, wherein the length of each of the plurality of serrations is approximately 10% of the local chord.

7. The rotor blade assembly of claim 1, wherein the cross-section of each of the plurality of serrations is generally linear.

8. The rotor blade assembly of claim 1, wherein the cross-section of each of the plurality of serrations is generally curvilinear.

9. The rotor blade assembly of claim 1, each of the serrations defining a thickness, and wherein the thickness of each of the plurality of serrations is in the range between approximately 0.1 millimeters and approximately 2.5 millimeters.

10. The rotor blade assembly of claim 9, wherein the thickness of each of the plurality of serrations is in the range between approximately 1 millimeter and approximately 2 millimeters.

11. The rotor blade assembly of claim 1, wherein the noise reducer is configured on the trailing edge of the rotor blade.

12. A rotor blade assembly for a wind turbine, comprising:
a rotor hub defining a center point,
a rotor blade extending from the rotor hub, the rotor blade having surfaces defining a pressure side, a suction side, a leading edge, and a trailing edge extending between a tip and a root; and,
a noise reducer configured on a surface of the rotor blade, the noise reducer comprising a plurality of serrations, each of the plurality of serrations defining a centerline,
wherein a line is defined for each of the plurality of serrations between the centerline of each of the plurality of serrations and the center point of the rotor hub, the line intersecting the centerline of each of the plurality of serrations at a base of each of the plurality of serrations, and wherein the centerline of each of the plurality of serrations is in the range between approximately 10 degrees from perpendicular to the line and approximately perpendicular to the line,
wherein a cross-section of each of the plurality of serrations is approximately parallel to a local flow streamline defined for that serration, and
wherein each of the plurality of serrations is individually oriented based on the line defined for that serration, and wherein a bend angle of each of the plurality of serrations is individually set to a pre-calculated orientation based on the local flow streamline, the cross-section of that serration and the span-wise location of that serration.

13. The rotor blade assembly of claim 12, wherein the centerline of each of the plurality of serrations is approximately perpendicular to the line.

14. The rotor blade assembly of claim 12, each of the plurality of serrations defining a width and a length, and wherein each of the plurality of serrations has a length to width ratio in the range between approximately 0.5:1 and approximately 4:1.

15. The rotor blade assembly of claim 12, the rotor blade defining a local chord for each of the plurality of serrations, each of the plurality of serrations defining a length, and wherein the length of each of the plurality of serrations is in the range between approximately 5% of the local chord and approximately 15% of the local chord.

* * * * *